United States Patent [19]
Whitehead

[11] Patent Number: 5,339,382
[45] Date of Patent: Aug. 16, 1994

[54] PRISM LIGHT GUIDE LUMINAIRE WITH EFFICIENT DIRECTIONAL OUTPUT

[75] Inventor: Lorne A. Whitehead, Vancouver, Canada

[73] Assignee: Minnesota Mining and Manufacturing Company, St. Paul, Minn.

[21] Appl. No.: 21,525

[22] Filed: Feb. 23, 1993

[51] Int. Cl.⁵ ............................................. G02B 6/00
[52] U.S. Cl. ..................... 385/146; 362/32; 385/133; 385/901
[58] Field of Search ............... 385/123, 129, 133, 146, 385/147, 901; 362/32

[56] References Cited

U.S. PATENT DOCUMENTS

| | | | |
|---|---|---|---|
| 4,105,293 | 8/1978 | Aizenberg et al. | 350/264 |
| 4,260,220 | 4/1981 | Whitehead | 385/133 |
| 4,335,421 | 6/1982 | Modla et al. | 362/223 |
| 4,337,759 | 7/1982 | Popovich et al. | 126/438 |
| 4,615,579 | 10/1986 | Whitehead | 385/133 |
| 4,750,798 | 6/1988 | Whitehead | 385/133 |
| 4,755,921 | 7/1988 | Nelson | 362/307 |
| 4,787,708 | 11/1988 | Whitehead | 385/133 |
| 4,791,540 | 12/1988 | Dreyer, Jr. et al. | 362/331 |
| 4,799,137 | 1/1989 | Aho | 362/309 |
| 4,805,984 | 2/1989 | Cobb, Jr. | 385/133 |
| 4,834,495 | 5/1989 | Whitehead et al. | 385/133 |
| 4,850,665 | 7/1989 | Whitehead | 385/133 |
| 4,874,228 | 10/1989 | Aho et al. | 350/345 |
| 4,906,070 | 3/1990 | Cobb, Jr. | 350/286 |
| 4,937,716 | 6/1990 | Whitehead | 362/268 |
| 4,984,144 | 1/1991 | Cobb, Jr. et al. | 362/339 |
| 4,989,125 | 1/1991 | Cobb, Jr. et al. | 362/346 |
| 4,996,632 | 2/1991 | Aikens | 362/32 |
| 5,016,143 | 5/1991 | Aikens | 362/32 |
| 5,043,850 | 8/1991 | Dreyer, Jr. | 362/26 |
| 5,117,478 | 5/1992 | Cobb, Jr. et al. | 385/133 |

FOREIGN PATENT DOCUMENTS

| | | |
|---|---|---|
| 0167721 | 1/1986 | European Pat. Off. |
| 90/04132 | 4/1990 | PCT Int'l Appl. |
| 713529 | 8/1954 | United Kingdom . |
| 2196100A | 4/1988 | United Kingdom . |

*Primary Examiner*—John D. Lee
*Attorney, Agent, or Firm*—Oyen Wiggs Green & Mutala

[57] ABSTRACT

A prism light guide luminaire has opaque and light emitting surface portions which together form a selected cross-sectional configuration. The opaque surface portion has a light reflecting characteristic. The light emitting surface portion is prism light guide material which confines, within the luminaire, light rays which strike the material at angles falling within the material's acceptance angular range. Within the luminaire, a light scattering area having a predefined shape and location redirects light into angles falling outside the material's acceptance angular range. The luminaire's cross-sectional configuration, the opaque surface portion's light reflecting characteristic, and the shape and location of the light scattering area are selected such that (i) light redirected by the light scattering area which does not pass directly from the scattering area to the light emitting surface portion and escape through that portion is substantially efficiently reflected by the prismatic material directly back onto the scattering area; and, (ii) all paths along which light may pass directly from the scattering area to the light emitting surface portion define a solid angle less than $2\pi$.

39 Claims, 10 Drawing Sheets

PRISM LIGHT GUIDE LUMINAIRE WITH EFFICIENT DIRECTIONAL OUTPUT

FIELD OF THE INVENTION

This application pertains to a prism light guide luminaire which efficiently emits light in a particular direction and which is capable of restricting the emitted light to a specified angular range.

BACKGROUND OF THE INVENTION

The basic prism light guide luminaire concept was first described by Whitehead in U.S. Pat. No. 4,615,579 issued Oct. 7, 1986 and was based on his prism light guide concept as described in U.S. Pat. No. 4,260,220. Since then many refinements to the prism light guide luminaire concept have been introduced, all of which are based on the principle that a prism light guide luminaire conducts light efficiently through a hollow air space by means of total internal reflection at the external surfaces of the guide, while allowing a pre-determined amount of light to escape at pre-determined points on the surface of the guide.

For example, U.S. Pat. No. 4,937,716 (Whitehead) describes how one may cause a prism light guide luminaire to emit light at a pre-determined rate which varies as a function of position on the surface of the guide. Briefly, light rays falling within the guide's acceptance angle encounter an internal diffusely reflecting surface which redirects a substantial portion of incident light into directions which cannot be confined within the guide by total internal reflection. Such redirected light rays are accordingly able to escape from the guide.

All such prior art prism light guide luminaires are encumbered by the fact that the light they emit is substantially diffuse. This limits the application of prior art prism light guide luminaires to situations in which diffuse light output is desirable, such as the many situations in which one might otherwise use fluorescent lamps. However, there are some situations in which it is preferable for a light source to emit somewhat collimated light. Examples include high bay lighting where it is important that light be efficiently directed downwardly from a high altitude location onto an illuminated surface; and, external sign illumination where light must be efficiently directed upwardly, through a restricted range of angles, onto the sign. It is an object of this invention to provide a prism light guide luminaire capable of efficiently emitting directed light in a manner which is practical to manufacture.

Prior art attempts to achieve directional light output from prism light guide luminaires have met with only limited success. One example is described in U.S. Pat. No. 4,850,665 (Whitehead) in which carefully oriented partially reflective, partially transmissive elements are mounted within the guide to reflect a pre-determined portion of the light passing through the guide into directions which the guide is unable to confine by total internal reflection, thus allowing such light to escape from the guide. Moreover, the direction of the reflected light is such that the natural refraction effect of the prismatic material used to form the guide further directs the escaping light into a pre-determined direction.

Alternate approaches are described in U.S. Pat. Nos. 4,984,144 and 4,989,125 (Cobb, Jr. et al). Portions of the prism light guide wall are removed and replaced with prismatic films which allow light to escape and which re-direct the escaping light into specific desired directions.

The prior art solutions aforesaid are subject to two fundamental problems. First, they require complex manufacturing and design techniques. It takes considerable effort to properly position and retain elements of the sort described by Whitehead in U.S. Pat. No. 4,850,665. Similarly, considerable effort is required to segment prism light guide wall material in accordance with the inventions of Cobb, Jr. et al. Moreover, these prior art approaches cannot collimate the escaping light to a degree which is substantially greater than the degree of collimation of the light within the prism light guide itself (typically ±30°). Fundamental thermodynamic limitations should allow substantially greater collimation of the emitted light, since the guide's light emitting area is usually much larger than the area through which light enters the light guide from the light source.

SUMMARY OF THE INVENTION

In accordance with the preferred embodiment, the invention provides a prism light guide luminaire having opaque and light emitting surface portions which together form a selected cross-sectional configuration. The opaque surface portion has a light reflecting characteristic. The light emitting surface portion is prism light guide material which confines, within the luminaire, light rays incident upon the material at angles falling within the material's acceptance angular range. The luminaire also has a light scattering area having a predefined shape and location for redirecting light into angles falling outside the acceptance angular range of the prism light guide material. The luminaire's cross-sectional configuration, the opaque surface portion's light reflecting characteristic, and the light scattering area's shape and location are selected such that (i) light redirected by the light scattering area which does not pass directly from the scattering area to the light emitting surface portion and escape through that portion is substantially efficiently reflected by the prism light guide material directly back onto the scattering area; and, (ii) all paths along which light may pass directly from the scattering area to the light emitting surface portion define a solid angle less than $2\pi$.

In one embodiment, the luminaire's cross-sectional configuration is approximately circular and the light scattering area is an elongate strip having a length approximately equal to the length of the light emitting surface portion, centred on a longitudinal axis of the approximately circular configuration. The prism light guide material has a flat side and a right angle isosceles prismatic side. In this embodiment the material is oriented with its flat side facing outwardly and its prismatic side facing inwardly.

In another embodiment, the luminaire has an approximately half-circular cross-sectional configuration, with the light emitting surface portion located on a curved portion of the half-circular configuration. The light scattering area is an elongate strip having a length approximately equal to the length of the light emitting surface portion, positioned against a flat portion of the half-circular configuration and centred on a longitudinal axis thereof. The prism light guide material is again oriented with its flat side facing outwardly and its prismatic side facing inwardly.

In yet another embodiment, the luminaire has an approximately elliptical cross-sectional configuration, and the light scattering area comprises two elongate strips each having a length approximately equal to the length of the light emitting surface portion with the strips respectively centred on lines which are the locus of the foci of the approximately elliptical configuration. In this embodiment, the prism light guide material is oriented with its flat side facing inwardly and its prismatic side facing outwardly. The ratio of the major to minor axes of the approximately elliptical cross-sectional configuration is selected such that light scattered by either strip onto the light emitting surface portion is incident upon that portion at such an angle that the light is refracted through the prism light guide material into a single direction which is approximately perpendicular to the material's flat side at that point.

In a still further embodiment, the luminaire has an approximately half-elliptical cross-sectional configuration, with the light scattering area again comprising two elongate strips each having a length approximately equal to the length of the light emitting surface portion. In this embodiment the strips are located against a flat portion of the half ellipse configuration and they are respectively centred on lines which are the locus of the foci of the half ellipse. The prism light guide material is oriented with its flat side facing inwardly and its prismatic side facing outwardly. The ratio of the major to minor axes of the approximately half elliptical configuration is such that light scattered by either strip onto the light emitting surface portion is incident upon that portion at an angle at which the light is refracted through the material into a single direction which is approximately perpendicular to the material's flat side at that point.

In any embodiment of the invention the light emitting surface portion preferably extends along the length of the luminaire over an elongate region having a small, substantially constant width.

In any embodiment, a linear fresnel lens may be positioned adjacent to and outside the luminaire's light emitting surface portion to re-direct the escaping light toward a substantially constant preferred direction over the entire extent of the light emitting surface portion.

In any embodiment, an additional piece of prism light guide material may be positioned parallel to and outside the light emitting surface portion with the additional piece's flat side facing inwardly, and with the additional piece's prisms aligned substantially parallel to the prisms of the light emitting surface portion material so that rays which escape through the light emitting surface portion material in two directions are emitted through the additional piece of material in a single direction perpendicular to the macroscopic plane of the material. Advantageously, the additional piece of material is separated from the light emitting surface portion material by a selected distance and the material has a selected thickness, whereby substantially all light transmitted through a prism face on the light emitting surface portion material strikes a parallel prism face on the additional piece.

In any embodiment, the luminaire may have a light deflecting means for imparting small relative directional changes to light rays propagated through the luminaire. This prevents certain types of rays from being "trapped" within the luminaire. The light deflection means may take one of several different forms, including: curvature of the luminaire along a longitudinal axis thereof; slight angular deviations in the luminaire's cross-sectional configuration relative to a mathematically ideal configuration; or, a screen mounted perpendicular to the luminaire's longitudinal axis.

BRIEF DESCRIPTION OF THE DRAWINGS

FIG. 2 also shows that light rays which are reflected by the extractor but escape from the guide only after further reflection escape in non-preferred directions.

DETAILED DESCRIPTION OF THE PREFERRED EMBODIMENT

Figure 1:
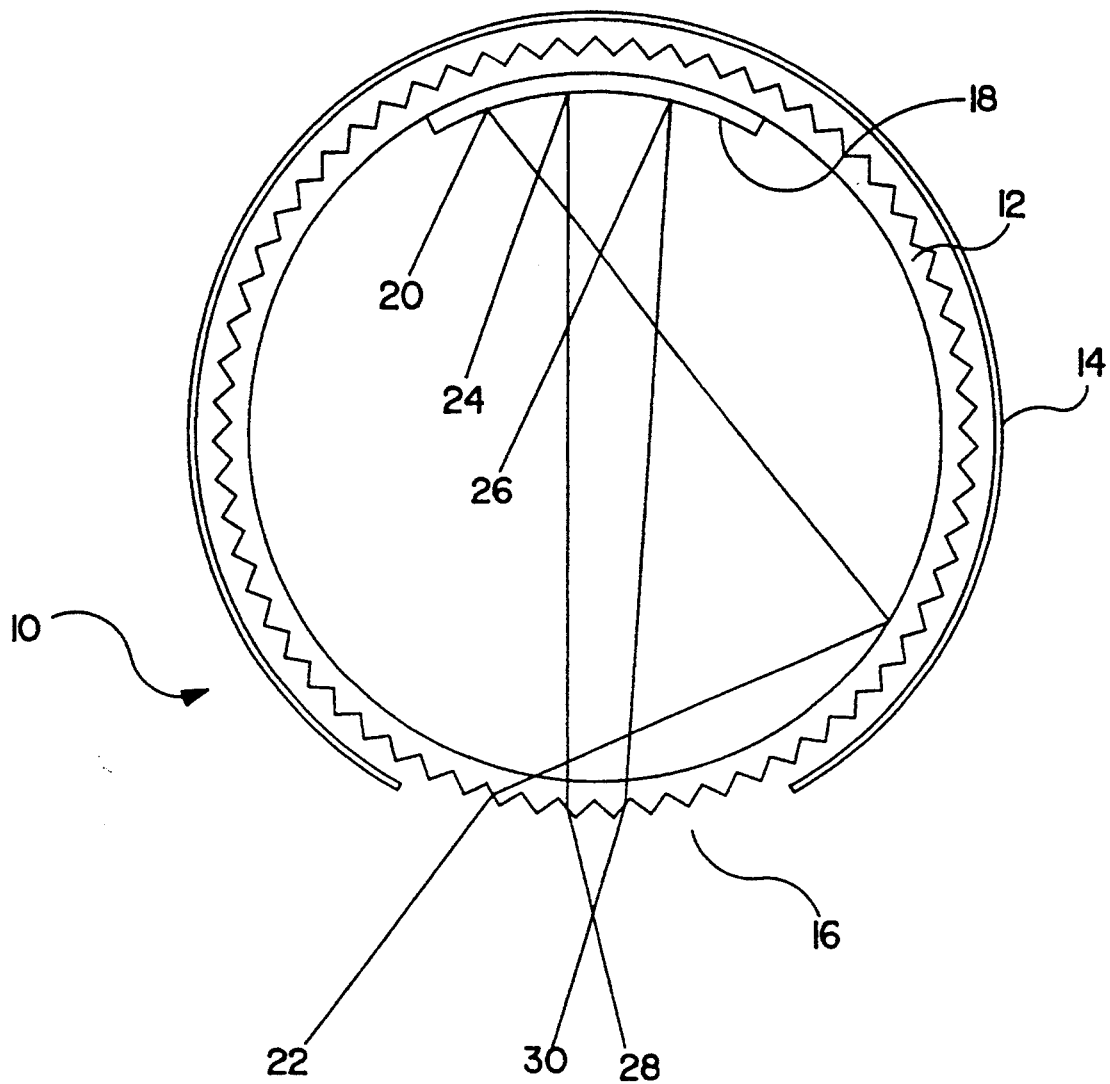
FIG. 1 is a cross-sectional illustration of a prior art prism light guide luminaire having a light extractor which causes the guide to emit light in a controlled manner.

FIG. 1 is a cross-sectional illustration of a prior art prism light guide luminaire 10 generally representative of those described in U.S. Pat. Nos. 4,615,579; 4,750,798; and, 4,787,708 (Whitehead). Light rays are propagated along and confined within light guide 12 by means of total internal reflection. Guide 12 is housed within an opaque cover 14 having a reflective inner surface and a light emitting aperture 16. A light scattering element 18 is mounted within guide 12. Light rays propagated along guide 12 occasionally strike scattering element 18, causing a random change in the direction of propagation of such rays; usually into a direction which guide 12 is unable to confine by total internal reflection, thus allowing such rays to escape from guide 12. For example, a light ray originating at point 20 is reflected by element 18 and strikes guide 12 at an angle which results in further reflection of the ray such that it escapes through the wall of guide 12 and exits through aperture 16 in a direction 22. Similarly, light rays originating at points 24, 26 strike element 18 and escape through guide 12 and aperture 16 in directions 28, 30 respectively. It is important to note that light can exit through aperture 16 in a very wide range of directions.

Figure 2:
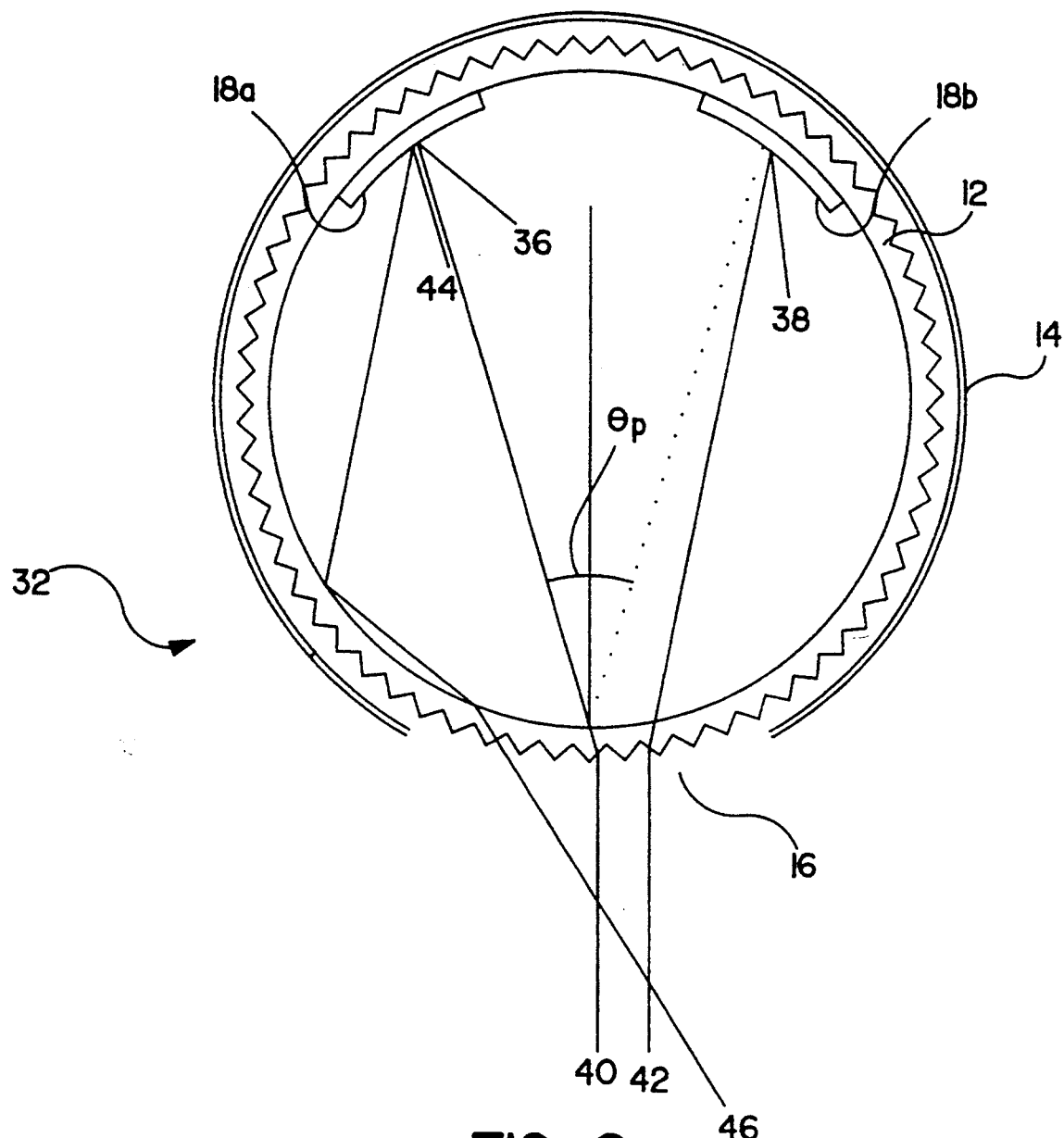
FIG. 2 shows how the FIG. 1 luminaire can be improved, in accordance with the prior art, so that light rays which are reflected by the extractor and which escape from the guide without further reflection escape in a preferred direction.

FIG. 2 depicts another prior art luminaire 32 which is identical to luminaire 10, except that the light scattering element is divided into two sub-elements 18a, 18b each of which covers a smaller area than element 18 of FIG. 1. Sub-elements 18a, 18b take the form of thin strips centred on points which are offset at an angle $\theta_p$ on either side of a perpendicular line 34 drawn through the centre of light emitting aperture 16. Light rays such as those shown originating at points 36, 38 are reflected by sub-elements 18a, 18b so that if they travel directly to aperture 16 they will escape, after refraction through the wall of guide 12, in preferred directions 40, 42 both of which are perpendicular to the macroscopic prism light guide wall surface at aperture 16. Such "directly escaping" rays are substantially collimated, with the collimation half angle being approximately equal to the total of the width of either one of sub-elements 18a or 18b, plus the width of aperture 16, divided by the diameter of luminaire 32. But, only a small fraction of the light reflected by sub-elements 18a, 18b falls into this "direct escaping" category. Most light rays, such as the ray shown originating at point 44, do not pass directly to aperture 16 after being reflected by sub-elements 18a or 18b, but reach aperture 16 indirectly after one or more additional reflections off the interior surfaces of guide 12. Such rays exit through aperture 16 in non-preferred directions which are not perpendicular to the macroscopic prism light guide wall surface at aperture 16, such as direction 46.

Figure 3:
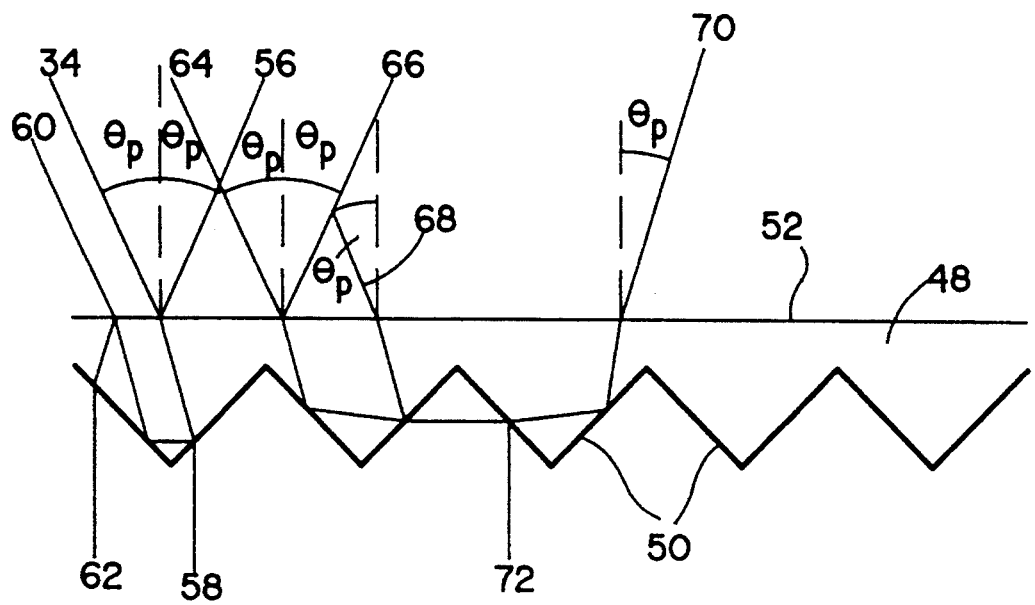
FIG. 3 is an enlarged cross-sectional illustration of prism light guide wall material showing that if a light ray strikes the material's flat surface at the correct incident angle it is transmitted through the material and exits the other side in a direction perpendicular to the flat surface; and, that all reflected rays are either specularly reflected or retro-reflected.

FIG. 3 is an enlarged cross-sectional illustration of a piece of prism light guide wall material 48 illustrating the important characteristic of this material which causes light to be emitted from prismatic surfaces 50 in a direction substantially perpendicular to the smooth surface 52 of the material. (The material need not be flat as shown, but may be and typically is curved to form a light guide structure). Light ray 54 is incident to flat surface 52 at an angle $\theta_p$ relative to the perpendicular. When ray 54 encounters surface 52, part of its light energy is reflected, as ray 56, which also makes an angle $\theta_p$ relative to the perpendicular. Another part of ray 54's light energy is transmitted through material 48 as ray 58 which is emitted from prismatic surface 50, in a direction perpendicular to flat surface 52. More generally, ray 58 is emitted from surface 50 in a direction perpendicular to surface 52 provided angle $\theta_p$ is as follows:

$$\theta_p = \sin^{-1} n \sin\left(\frac{\pi}{8} - \sin^{-1}\frac{1}{n}\sin\frac{\pi}{8}\right) \quad (1)$$

where n is the refractive index of material 48.

A further part of ray 54's light energy is retro-reflected by prismatic surface 50 as ray 60, rather than being transmitted therethrough as ray 58. A still further part of ray 54's light energy is reflected at the internal side of flat surface 52 and subsequently escapes through prismatic surface 50 as ray 62. The octature geometry of prism light guide wall material 48 (as defined in U.S. Pat. No. 4,260,220) ensures that ray 60 is retro-reflected such that it also makes an angle $\theta_p$ relative to the perpendicular, on the same side of the perpendicular as ray 54, rather than the normal specular direction as is ray 56. Similarly, the octature geometry ensures that escaping ray 62 is also perpendicular to the macroscopic flat surface 52, as is ray 58.

FIG. 3 shows that the characteristics described above for ray 54 also apply to ray 64. That is, ray 64 is partially reflected at flat surface 52 as ray 66; and, is retro-reflected as ray 68 after being twice reflected internally at prismatic surface 50. Rays 70 and 72 are emitted after traversing more complex paths. But, in all cases, all of ray 64's light energy is either transmitted through material 48 in a direction perpendicular to surface 52; or, reflected from surface 52 in the specular or retro direction at the same angle, relative to the cross sectional plane (i.e. surface 52), as the incident ray 64,.

Figure 4:
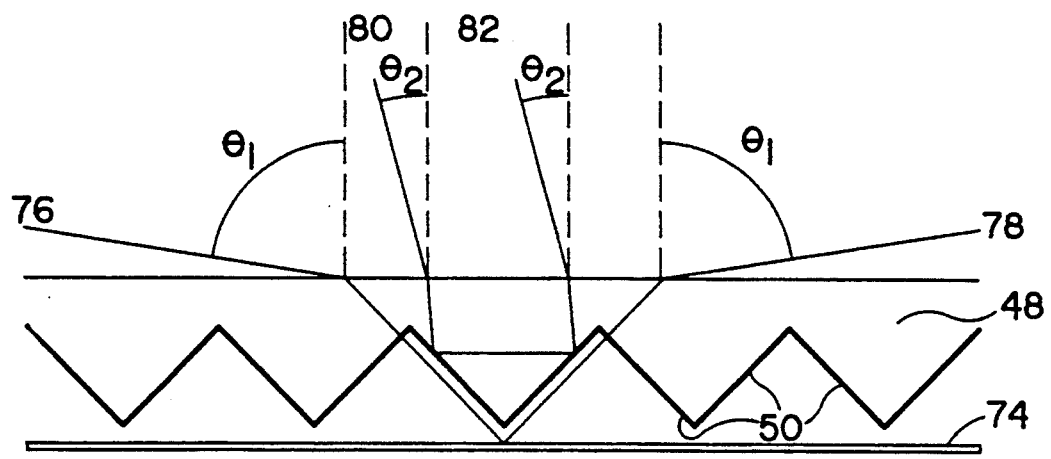
FIG. 4 is similar to FIG. 3, but shows a specular reflector positioned adjacent the prismatic surfaces of the prism light guide wall material such that all light rays striking the material's flat surface undergo a net specular reflection or a net retro-reflection.

FIG. 4 shows a planar specular reflector 74 positioned adjacent the prismatic surfaces 50 of prism light guide wall material 48. Reflector 74 reflects most of the light incident upon it. Substantially all light energy is eventually reflected by this structure, as shown by the paths of rays 76–78 (specular reflection by reflector 74) and rays 80–82 (retro-reflection by prismatic surface 50). Thus, by adding external specular reflector 74, one may ensure that for all angles of incident light, the light energy is on a net basis reflected either in the specular or the retro direction in the cross sectional plane.

Figure 5:
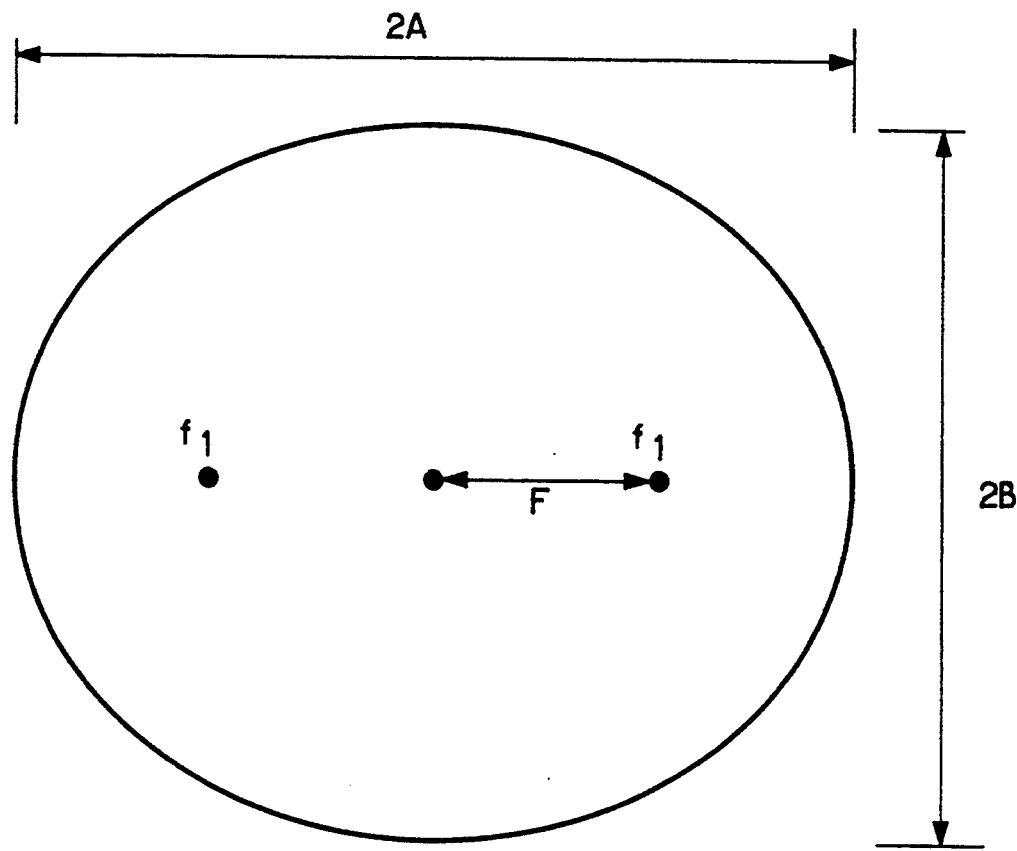
FIG. 5 depicts an ellipse and certain mathematical properties thereof.

FIG. 5 depicts an ellipse having major axis half length A, minor axis half length B, focus distance F, and foci $f_1$, $f_2$. It is well known that A, B and F are related as follows:

$$F = \sqrt{A^2 - B^2} \quad (2)$$

and that the angle $\theta$ is given by:

$$\theta = \tan^{-1}\frac{F}{B} = \tan^{-1}\sqrt{\left(\frac{A}{B}\right)^2 - 1} \quad (3)$$

Figure 6A:
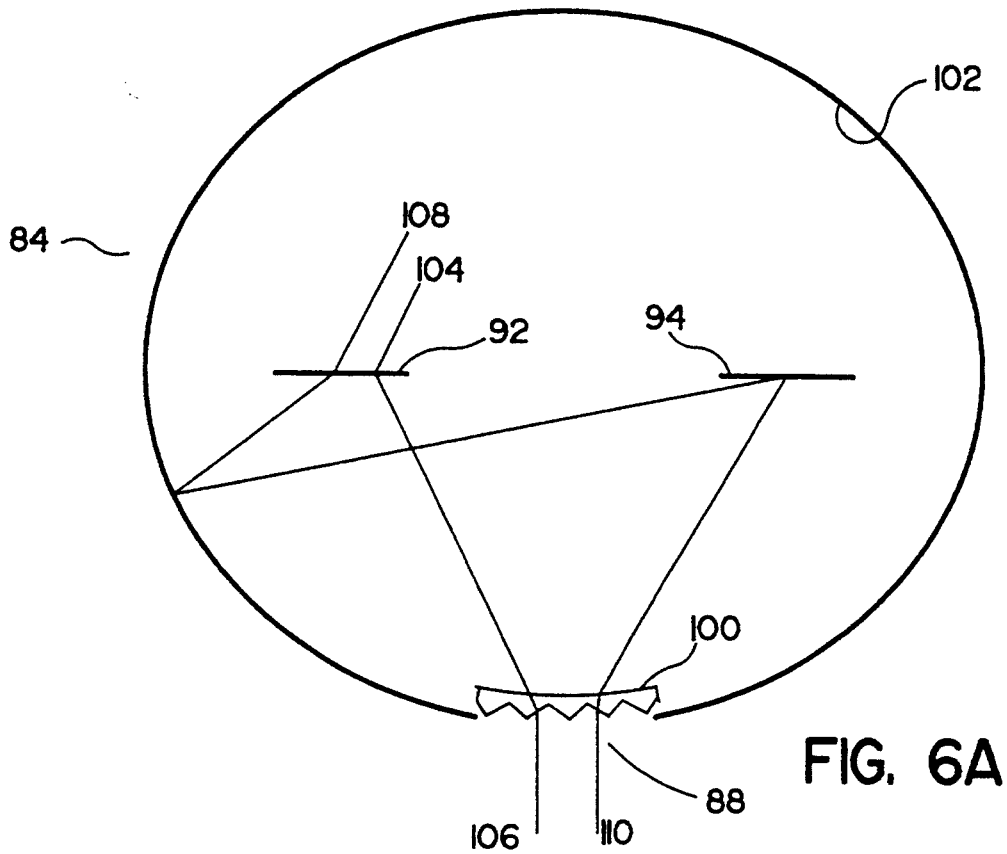
FIGS. 6(a) and 6(b) are cross-sectional illustrations of prism light guide luminaires having elliptical cross-sections in accordance with a first embodiment of the invention.

The present invention may be embodied in prism light guide luminaires 84, 86 having elliptical cross-sectional configurations as shown in FIGS. 6(a) and (b) respectively. The Outer surface portions of luminaires 84, 86 are opaque (i.e. light incident upon the luminaires' opaque internal surfaces is reflected inwardly) except for light emitting surface portions or apertures 88, 90 which are located on the luminaires' respective minor axes. The light scattering areas are dual strip light scattering elements 92, 94 and 96, 98. The strips are centred on the respective foci of the ellipse, for which the angle $\theta$ has the value $\theta_p$ given in equation (1). When applied to equations (2) and (3), for typical prism light guide wall material having refractive index n=1.6, this yields a ratio A:B of approximately 1.16, and places the foci about 0.52A from the centre of the major axis, with the angle $\theta_p$ being approximately 32°.

In the FIG. 6(a) embodiment, prism light guide wall material 100 is used only in light emitting aperture 88. The remainder of the interior of luminaire 84 is formed of opaque, specularly reflective material 102, which could be polished metal, metallic film deposited on plastic film, or other suitably highly reflective specular surface. In the case of light rays which pass directly to prism light guide material 100 after being scattered by elements 92, 94 light guide 84 behaves essentially identically to light guide 32 described above in relation to FIG. 2. For example, light ray 104 is scattered by element 92, passes directly to material 100, and is emitted therefrom in a perpendicular direction as ray 106.

A key feature distinguishing light guide 84 from light guide 32 is the manner in which guide 84 treats light rays which do not pass directly to prism light guide material 100 after being scattered by elements 92, 94. For example, light ray 108 is scattered by element 92 to a point on the reflective inner surface of material 102, at which it is specularly reflected. An ellipse has the mathematical property that such a specularly reflected ray originating at or near one focus will be reflected to a point at or near the opposite focus. Therefore, as shown in FIG. 6(a), the specularly reflected ray travels directly to light scattering element 94 at the other focus, and is scattered again. The ray is then shown passing directly to material 100, through which it is emitted in a perpendicular direction as ray 110. In other cases, the specularly reflected ray may be scattered by element 94 such that it undergoes additional intermediate specular reflection at another point on the reflective inner surface of material 102. But the light energy inevitably eventually reaches light emitting aperture 88 and is emitted therethrough in the perpendicular direction.

The FIG. 6(a) embodiment thus combines two key features. First, because light scattering elements 92, 94 occupy a relatively small solid angle relative to aperture 88, and by virtue of the previously described geometric properties of prism light guide wall material 100, light scattered directly by elements 92, 94 to material 100 is emitted in a narrow range of angles centred on the perpendicular to the macroscopic surface of prism light guide wall material 100. Second, the elliptic geometry of guide 84 prevents light rays from escaping indirectly through material 100. That is, light rays which do not pass directly from elements 92, 94 to material 100 are efficiently reflected back to scattering elements 92, 94 where they have another opportunity to pass directly to the light emitting region (i.e. material 100 within aperture 88). Thus, very little light energy can escape at angles outside the angular range characteristic of direct emission from the area occupied by light scattering elements 92, 94. Most of the light energy is efficiently, preferentially emitted in this desired angular range.

In principle, the angular range of the escaping light, viewed in the cross sectional plane, can be substantially less than the divergence angle of the light propagating through prism light guide 84. Indeed, the divergence of the light propagating through prism light guide 84 has no effect whatsoever on the angular distribution of the emitted light, since all directional attributes of the transmitted light are lost after the light is randomly scattered by elements 92, 94. In practice, the primary factor which will limit the degree of collimation possible will be the practical limitation of the reflectivity of surface 102. The smaller the size of light emitting aperture 88, and scattering elements 92, 94 the larger the number of optical reflections a light ray must undergo before escaping from guide 84. This increases the amount of light loss due to absorption; and, increases the possibility of light travelling the entire length of guide 84 and back to the light source and hence being lost. In practice, it has been found that it is practical to restrict the output angular range to less that ±20° in the cross sectional direction, a degree of collimation which is very useful in general downlighting applications, and in the external illumination of outdoor signs.

Figure 6B:
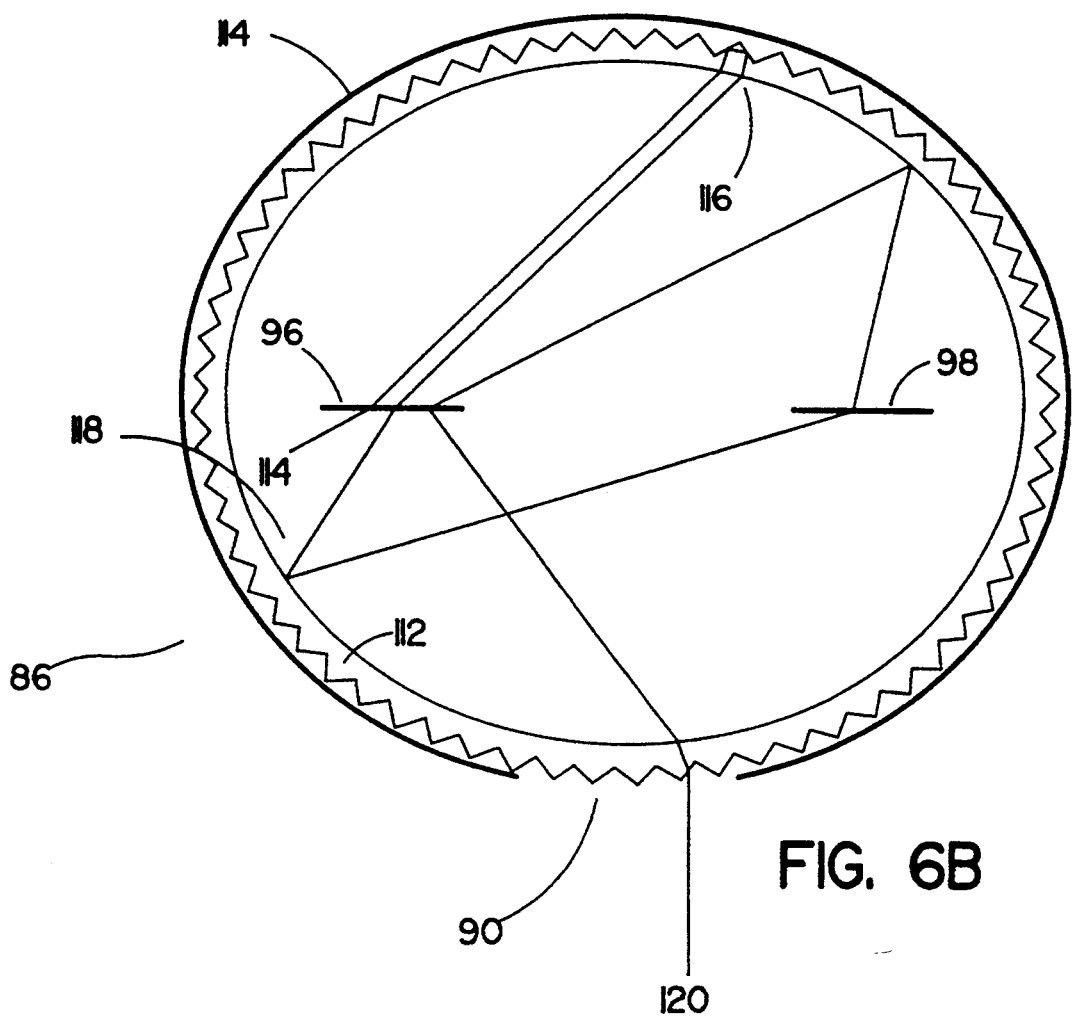

FIG. 6(b) shows how the FIG. 6(a) guide can be adapted to reduce light loss by absorption due to multiple internal reflections, as mentioned above. In FIG. 6(b), prism light guide wall material 112 surrounds the entire interior of the elliptical configuration, and specularly reflective material 114 is positioned outside material 112 over the entire non light emitting portion of guide 86. As described above in relation to FIG. 4, the combination of specular reflective material and prism light guide material yields a surface which is partially specularly reflective and partially retro-reflective in the cross sectional plane. This is completely compatible with the desired behaviour of guide 86.

In particular, as shown in FIG. 6(b), light ray 114 is scattered by element 96 such that it travels first to point 116 on the non light emitting portion of guide 86, where it is retro-reflected in the cross sectional plane back to the portion of element 96 from which it originated. Then, the ray is again scattered by element 96, this time travelling to another point 118 on the non light emitting portion of guide 86, where it undergoes specular rather than retro-reflection and hence passes to the other ellipse focal region occupied by element 98. Thus, regardless of whether a particular ray is retro-reflected, or specularly reflected, or both, all of that ray's light energy is returned to the light scattering area occupied by elements 96, 98; unless the ray passes directly from one of elements 96, 98 to light emitting aperture 90, in which case it escapes through aperture 90 in perpendicular direction 120. This configuration, in which prism light guide wall material 112 covers the entire interior of guide 86, results in more efficient light guidance, more efficient concentration of scattered light onto light emitting aperture 90, and is also in many circumstances a more practical configuration to manufacture.

For the FIG. 6(a) and 6(b) embodiments to work properly, the material used to form light scattering elements 92, 94, 96, 98 should be translucent; or, it should scatter only light which is incident upon the side of the material which faces the light emitting aperture, and should be specularly reflective on the other side. If the material scattered light incident upon its side facing away from the light emitting aperture, that light would not escape from the guide unless another light emitting aperture was provided on the opposite side of the guide (i.e. opposite to apertures 88, 90 respectively).

Figure 7:
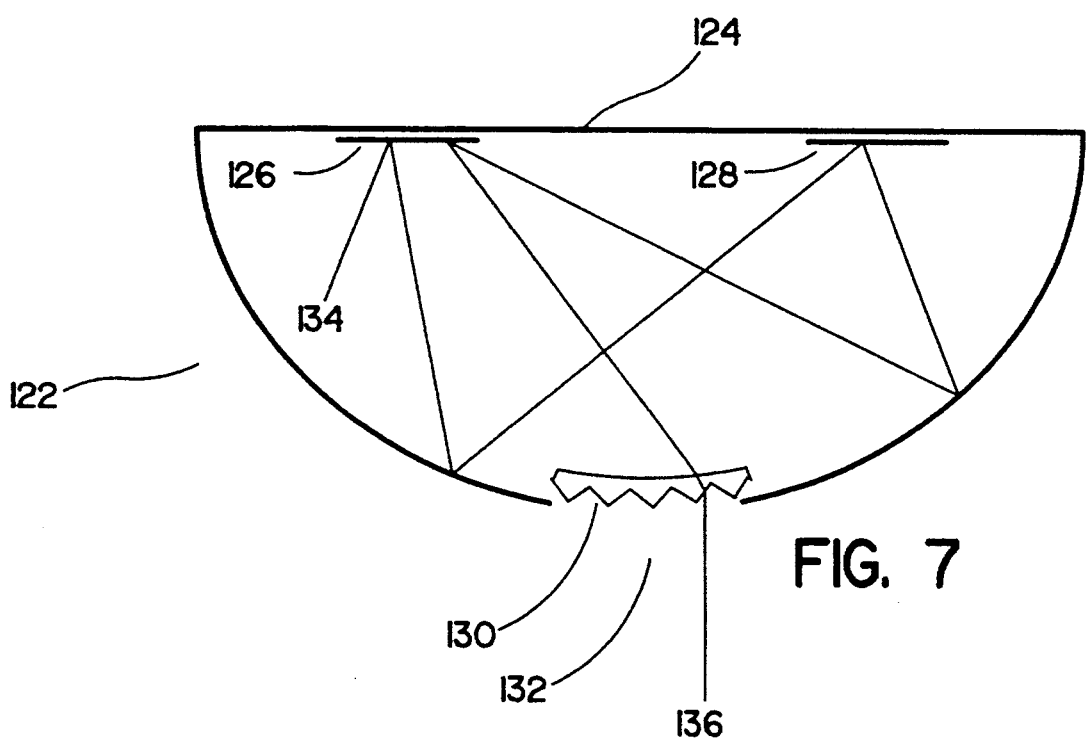
FIG. 7 is a cross-sectional illustration of a prism light guide luminaire having a half-elliptic cross-section in accordance with another embodiment of the invention.

The foregoing considerations help to show the advantage of another embodiment of the invention, shown in FIG. 7, in which the cross-sectional configuration of the light guide 122 is a half ellipse with its non-curved portion 124 lying on the major axis of the ellipse, and with light scattering elements 126, 128 positioned against the major axis at the ellipse foci. As illustrated, light guide 122 is analogous to fully elliptic guide 84, in that prism light guide wall material 130 is used only in light emitting aperture 132, with the remainder of the interior of guide 122 being formed of specularly reflective material. However, it will be understood that guide 122 may be made of a combination of specularly reflective material and prism light guide wall material as discussed previously. The behaviour of light guide 122 is essentially the same as described above for fully elliptic light guides 84, 86. As shown in FIG. 7, light ray 134 eventually exits as ray 136 travelling in the perpendicular direction. But, note that in guide 122, light scattering elements 126, 128 can be completely opaque, and that the structure is less deep than guides 84, 86.

Because light scattering elements 126, 128 of guide 122 need not be transmissive, they can take a wide variety of forms. For example, the desired light scattering effect could be achieved by applying white paint to elements 126, 128; or, by silk screen printing the elements; or, by adhering a separate white or translucent film to the elements. A further advantage of this design is that there is no need for separate physical means to position the light scattering elements at the ellipse foci, as is required in the case of light guides 84, 86.

Figure 8:
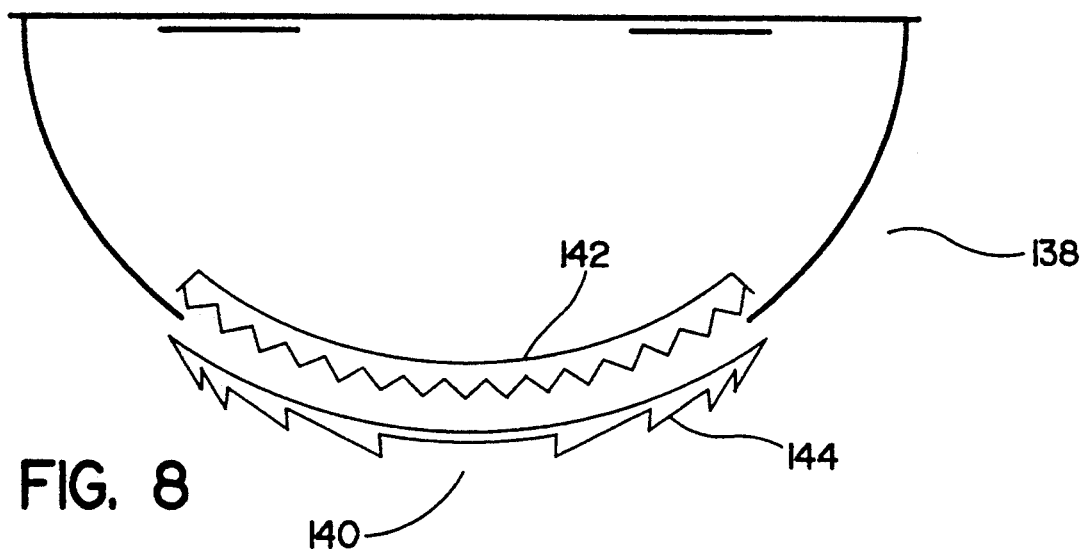
FIG. 8 is similar to FIG. 7, but shows the luminaire with an enlarged light emitting portion and with a fresnel lens mounted over the light emitting portion.

FIG. 8 shows another half-elliptic light guide 138 which is similar to guide 122, except that light emitting aperture 140 in guide 138 is substantially larger than aperture 132 in guide 122. Prism light guide wall material 142 is provided in aperture 140. Light emitted through any small region of material 142 will be reasonably well collimated. But, the perpendicular direction to the prismatic surface of material 142 will vary over that surface, because the elliptic configuration of guide 138 subjects the surface to substantial curvature over its larger area. In some cases this effect may be desirable and useful, but in many cases it will not be. Nevertheless it is advantageous to increase the size of the light emitting aperture, because this reduces the average number of internal reflections the light energy must undergo before escaping, and therefore improves the efficiency of the device. Therefore, as shown in FIG. 8, it is often desirable to make aperture 140 larger, and to employ a linear fresnel lens 144 to re-direct the escaping light toward a substantially constant preferred direction over the entire extent of aperture 140.

This is a simple technique, because generally speaking it is not necessary for fresnel lens 144 to be highly precise, given that the overall angular range of the output light is normally in excess of 10°. Because of this low tolerance, it will often be possible to use off-the-shelf linear fresnel lenses rather than ones which are custom designed for this particular job. Alternatively, it will often be possible to mould the necessary fresnel lens shape into a protective external cover for the light guide luminaire, using comparatively crude moulding techniques such as extrusion and embossing to achieve the approximate desired fresnel lens profile.

The embodiments discussed above employ elliptical configurations, but that is not the only means of achieving the benefits of the invention. In general, light guides constructed in accordance with the invention have cross-sections conforming to specific mathematical configurations, and have light scattering area(s) at specific location(s), so that two basic conditions are satisfied. First, light which passes directly from the light scattering area(s) to the light emitting portion of the guide is emitted in a substantially non-diffuse manner. Second, light which does not pass directly from the light scattering area(s) to the light emitting portion of the guide is substantially reflected back onto the light scattering area(s), so that it has another opportunity to pass directly to the light emitting portion and thus escape in the desired non-diffuse manner.

Figure 9:
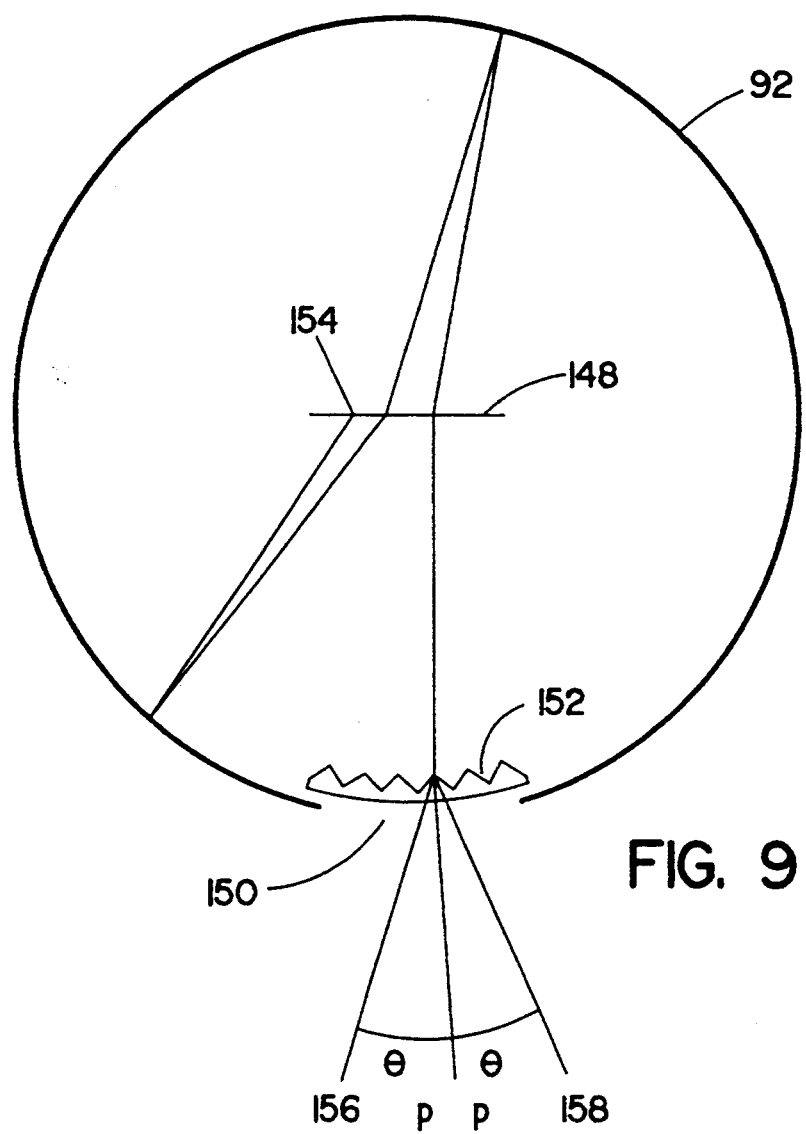
FIG. 9 is a cross-sectional illustration of a prism light guide luminaire having a circular cross-section in accordance with another embodiment of the invention.

FIG. 9 shows an alternate configuration incorporating these basic design concepts. In this case the light guide 146 is cylindrical (circular in cross section), and the light scattering element 148 is a single elongate strip having a length approximately equal to the length of light emitting aperture 150 and centred on the axis of the cylindrical guide. The light emitting aperture 150 contains prism light guide wall material 152 with the prisms facing inward, rather than outward (which is one of a wide variety of prismatic configurations falling within the general definition of "prism light guide"). It is necessary for the prisms to face inward in this embodiment, in order that a substantial amount of the light passing directly from light scattering element 148 to material 152 can be efficiently transmitted.

As shown in FIG. 9, light ray 154 undergoes several interactions and then passes directly from light scattering element 148 to light emitting aperture 150 through which it is emitted in two different directions 156, 158. These are different directions, but they both lie at the same angle $\theta_p$ relative to the normal direction to the macroscopic surface of material 152. An advantage of this design is that circular cross sections are often simpler to produce than elliptic cross sections. But, a definite disadvantage is that the emitted light, while non-diffuse, is concentrated in two directions which are the mirror image of one another relative to a plane which passes through the axis of the guide and lies perpendicular to the macroscopic prism light guide wall surface at aperture 150.

Figure 10:
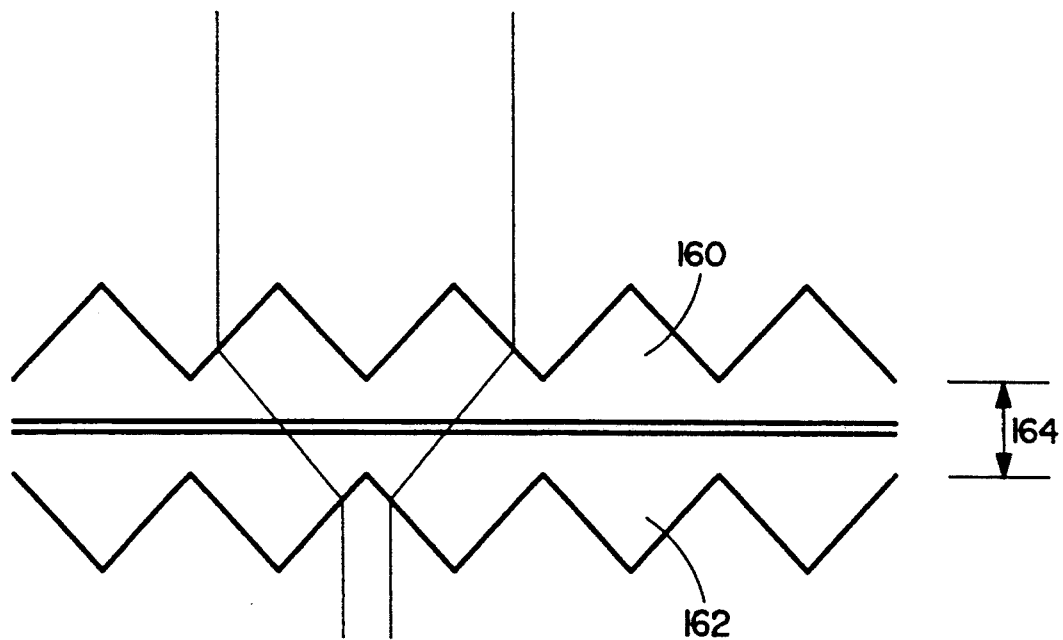
FIG. 10 is an enlarged cross-sectional illustration of two pieces of prism light guide wall material placed back to back so that light which strikes the upper prismatic surface perpendicular to the flat surfaces is redirected and emitted from the lower prismatic surface perpendicular to the flat surfaces.

FIG. 10 shows how light emitted in two directions from guide 146 can be redirected into a single direction. In FIG. 10, prism light guide wall material 160 represents material 152 shown in FIG. 9. By placing another piece 162 of prism light guide wall material adjacent material 160 one may efficiently "undiverge" the escaping light. Moreover, any light rays reflected by partial reflections on interior surfaces return in the perpendicular direction and thus return to the light scattering element for re-use. Light transmission by the FIG. 10 arrangement is particularly efficient if the pieces of material 160, 162 lie adjacent one another as shown, with the prismatic surfaces separated by a distance 164 which is selected such that, to the greatest possible extent, light rays travel directly from a prismatic surface on material 160 to a corresponding parallel prismatic surface on the other piece of material 162. Such precision alignment is not necessary, however, as even with poor alignment a substantial fraction of the light rays will be transmitted and substantially all of the reflected light rays will be returned to the light scattering element for re-emission.

Figure 11:
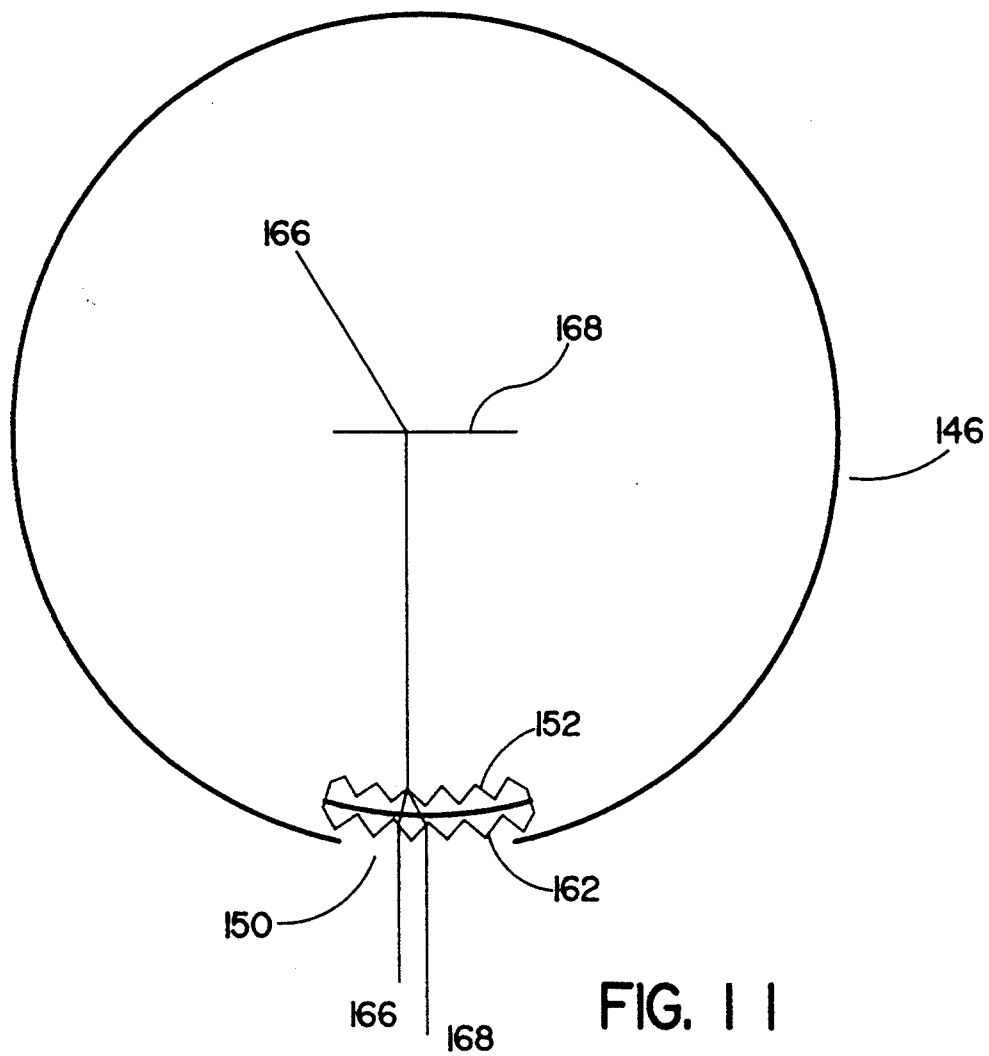
FIG. 11 shows how the light redirecting technique of FIG. 10 can be applied to the luminaire of FIG. 9.

FIG. 11 shows how the FIG. 10 concept is applied to light guide 146 of FIG. 9 to achieve directional light output in a direction perpendicular to the macroscopic plane of the prism light guide wall material at the light emitting portion. Light ray 166 is scattered by element 148 and then passes directly to light emitting aperture 150, escaping through material 152 in two different directions as aforesaid. The additional piece of prism wall guide material 162 placed adjacent material 152 as described above in relation to FIG. 10, redirects the two escaping rays so that they are both emitted in directions 166, 168 perpendicular to the macroscopic plane of the material at light emitting aperture 150.

Figure 12:
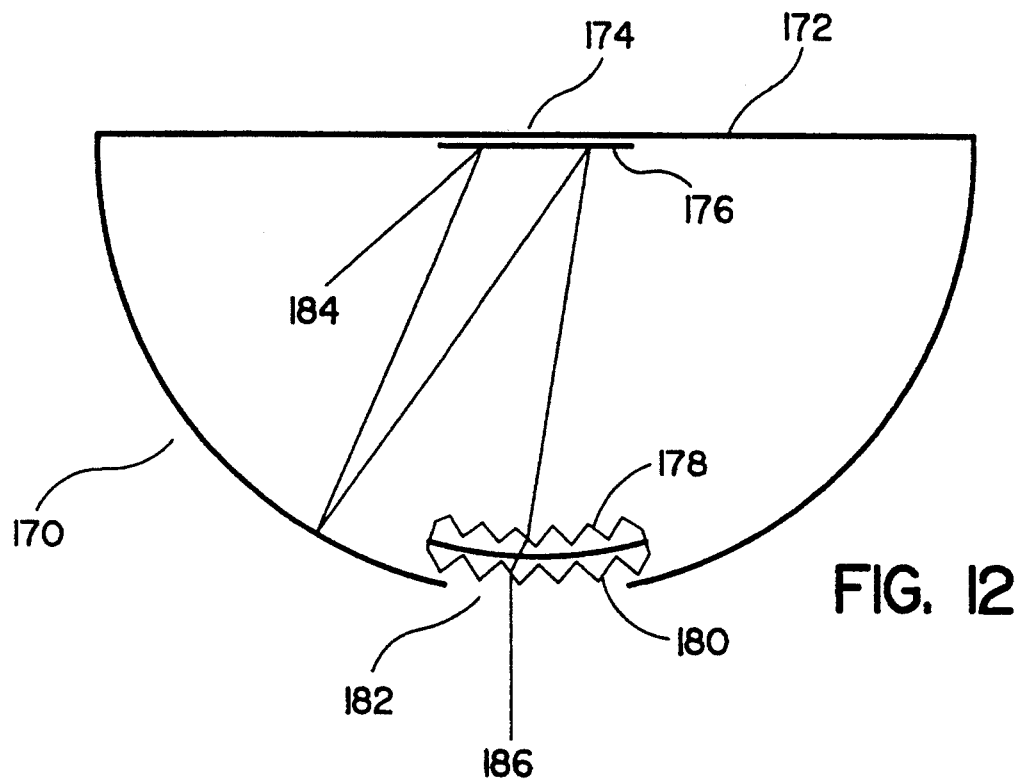
FIG. 12 is similar to FIG. 11, but shows a luminaire with a semi-circular cross-section.

The same considerations which led to the half ellipse embodiment of FIG. 7 apply to the circular cross section. Thus, as shown in FIG. 12, a half-cylindrical light guide 170 having a half-circular cross section can be provided with its non-curved portion 172 lying on the guide's cylindrical axis 174, and with light scattering element 176 positioned against axis 174. As illustrated, light guide 170 is analogous to fully cylindrical guide 146, in that back-to-back pieces of prism light guide wall material 178, 180 are used only in light emitting aperture 182, with the remainder of the interior of guide 170 being formed of specularly reflective material. However, it will be understood that guide 122 may be made of a combination of specularly reflective material and prism light guide wall material as discussed previously. The behaviour of light guide 170 is essentially the same as described above in relation to FIG. 11 for fully cylindrical light guide 146. As shown in FIG. 12, light ray 184 eventually exits as ray 186 travelling in the perpendicular direction. In guide 170, unlike guide 146, light scattering element 176 can be completely opaque. Guide 170 is also less deep than guide 146.

Figure 13:
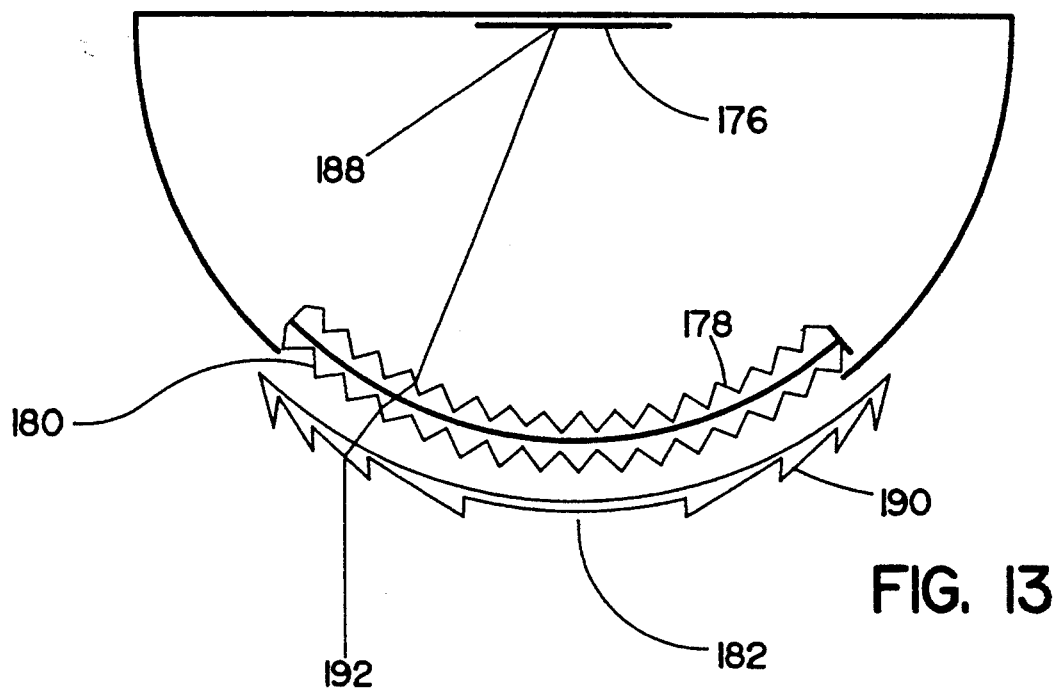
FIG. 13 is similar to FIG. 12, but shows the luminaire with an enlarged light emitting portion and with a fresnel lens mounted over the light emitting portion.

Similarly, the concept of enlarging the light emitting aperture and then correcting for angular deviations in the emitted light with a fresnel lens can be applied to the half-circular embodiment, as shown in FIG. 13. The FIG. 13 light guide is similar to the FIG. 8 light guide, except that the FIG. 13 guide is half-circular in cross section and has back-to-back pieces of prism light guide wall material 178, 180 in light emitting aperture 182. Light ray 188 is scattered by element 176 and then passes directly to light emitting aperture 182, escaping through material 178 in two different directions as aforesaid. The additional piece of prism wall guide material 180 placed adjacent material 178 redirects the two escaping rays so that they are both emitted in directions perpendicular to the macroscopic plane of the material at light emitting aperture 182. But, due to the curvature imposed by the enlarged aperture, the perpendicular direction to the prismatic material varies across aperture 182, so fresnel lens 190 is provided to re-direct the escaping light toward a substantially constant preferred direction 192 over the entire extent of aperture 182.

It is important to note that the previously described techniques of an enlarged light emitting aperture having a fresnel lens; and, the use of either specular reflective material alone, or a combination of prism light guide wall material and specular material to form the non light emitting portion of the light guide; can be applied to all embodiments of the invention. The optimum combination of these techniques will depend upon a careful analysis of the cost of the materials used, and the desired efficiencies to be obtained.

Figure 14A:
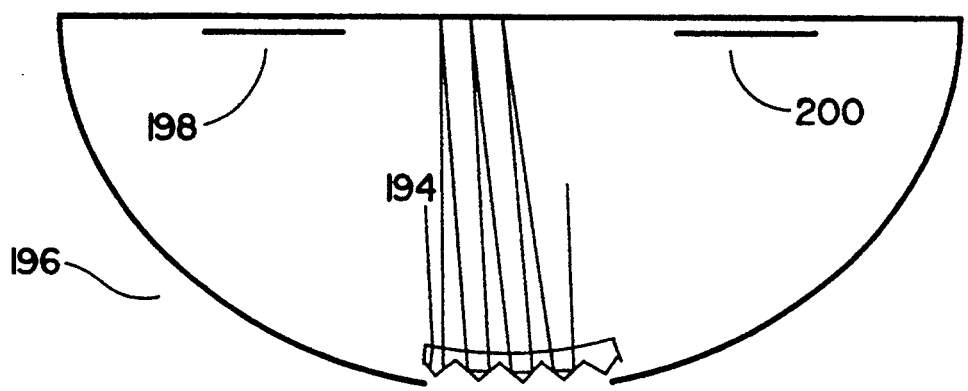
FIGS. 14(a) and 14(b) are cross-sectional illustrations of luminaires like that of FIG. 7, showing that such luminaires may repeatedly reflect certain light rays without directing them to an extractor, so that the rays do not escape from the luminaire.

Another factor which can affect the efficiency of prism light guides constructed in accordance with the invention is illustrated in FIGS. 14(i a) and 14(b). FIG. 14(a) shows a light ray 194 undergoing multiple reflections within a light guide 196 having a half-elliptic cross-section in a manner which does not result in ray 194 ever reaching light scattering elements 198 or 200. It is a mathematical property of the ellipse that such light paths exist. Rays traversing such paths in guide 196 will not be efficiently emitted.

Figure 14B:
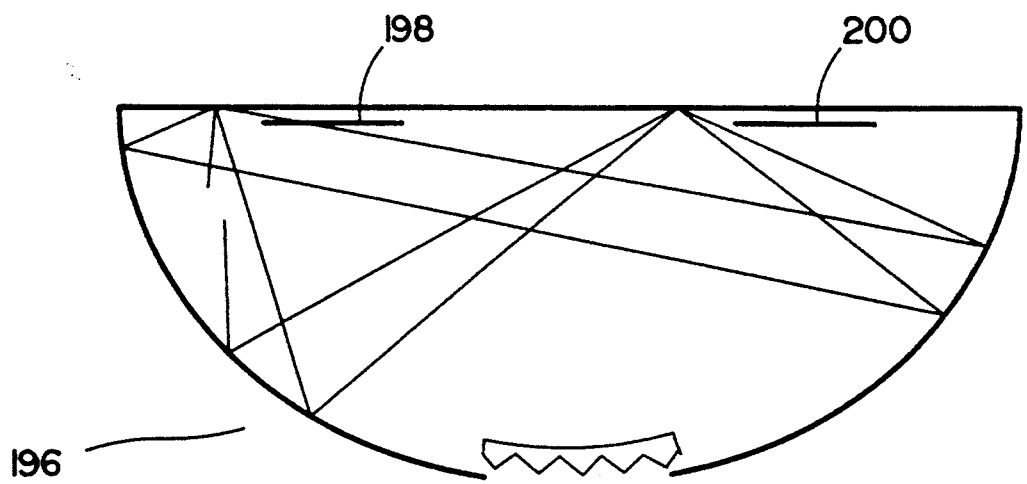

FIG. 14(b) depicts the same half-elliptic light guide 196 and shows another example of a light ray undergoing multiple reflections without ever reaching light scattering elements 198 or 200. Similar problems exist for light guides having fully elliptic, fully cylindrical, or half-cylindrical cross-sections; and probably also exist for light guides having any other configuration which very precisely achieves the design goal of re-directing substantially all of the light scattered from the light scattering area back to the light scattering area in the event that it does not pass directly to and escape from the light emitting portion of the guide. Fortunately, there are several solutions to this problem, all of which slightly degrade the precision of the above mentioned light re-direction, but to an extent which does not substantially impede the basic operation.

Figure 15:
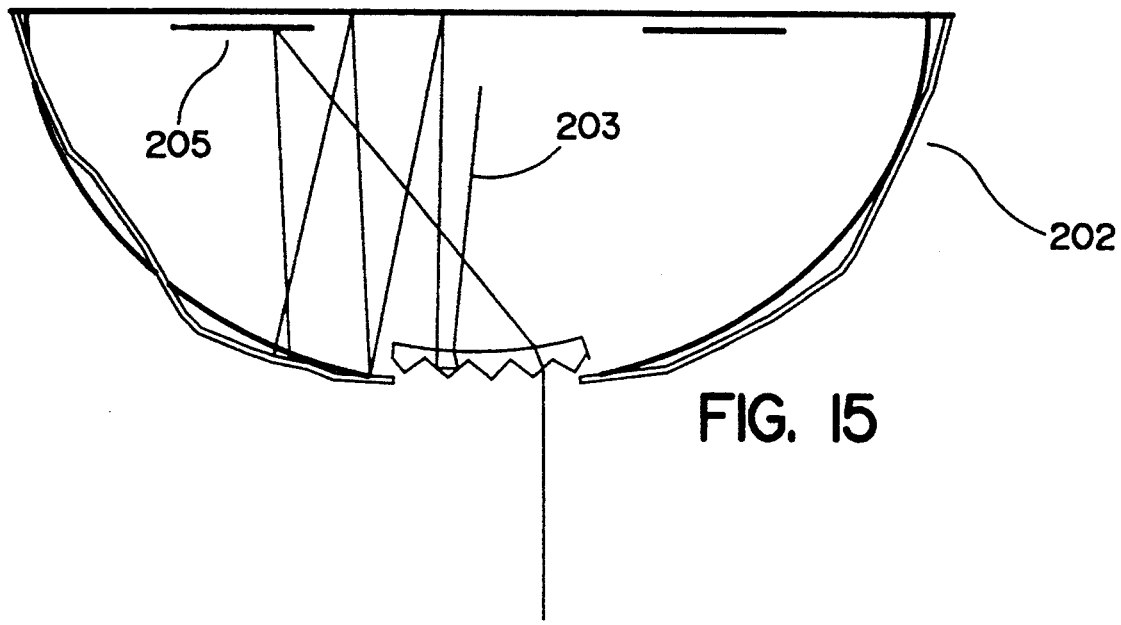
FIG. 15 shows how the FIG. 7 luminaire can be adapted to counteract the problem illustrated in FIGS. 14(a) and 14(b).

FIG. 15 shows one solution, in which the cross-sectional configuration of light guide 202 deviates slightly from the mathematically ideal ellipse, circle, or whatever other mathematical configuration is employed to achieve the aforementioned design goal. The deviation may take the form of physical distortion as shown in FIG. 15, or may result from angular deviations within, or in the orientation of, prismatic reflective materials. In any case, the deviation is slight enough that for the small number of reflections required for the light to escape after scattering, the design goals are not significantly compromised (i.e., minimal light is lost by absorption, or emitted outside the preferred angular output range); but, over the larger number of reflections a light ray undergoes as it propagates along the guide, the deviation is sufficient to free rays that would otherwise be confined to paths like those shown in FIGS. 14(a) and 14(b). Thus, light ray 203 slowly traverses the cross section, eventually reaches light scattering element 205, and escapes.

Figure 16:
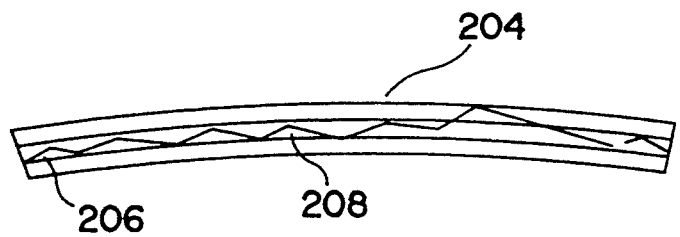
FIG. 16 is a top view of a prism light guide luminaire having the same cross-section as the FIG. 7 luminaire, and showing another way in which the luminaire can be adapted to counteract the problem illustrated in FIGS. 14(a) and 14(b).

FIG. 16 shows another solution, by depicting a top view of a prism light guide 204 having the half-elliptic cross section shown in FIGS. 14(a) and 14(b), but with a slightly curved longitudinal axis. Light ray 206, which would otherwise be confined to paths like those shown in FIGS. 14(a) and 14(b), slowly traverses the cross section in a manner similar to that shown in FIG. 15, eventually reaches light scattering strip 208, and escapes.

Figure 17:
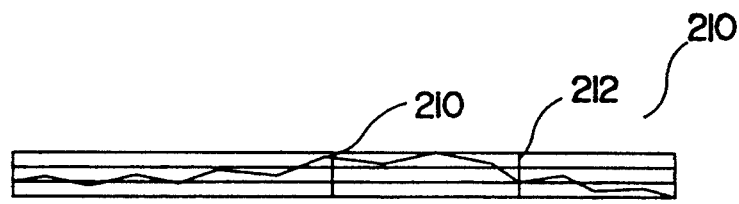
FIG. 17 is a top view of a prism light guide luminaire having the same cross-section as the FIG. 7 luminaire, and showing yet another way in which the luminaire can be adapted to counteract the problem illustrated in FIGS. 14(a) and 14(b).

Yet another solution is shown in FIG. 17, in which light deflecting screens 210, 212 are placed at intervals along the length of prism light guide 210. Screens 210, 212 have the property that they efficiently transmit light, but slightly change the light's direction, again in order to change ray propagation characteristics sufficiently to allow otherwise trapped rays to escape. Screens 210, 212 may be sheets of acrylic doped with Rohm & Haas PLEXI-L TM additive to create small angular deviations, with low back scatter.

FIGS. 15, 16, and 17 illustrate specific examples of solutions to the problem depicted in FIG. 14(a) and 14(b), but numerous other methods could be utilized.

All that is needed is a means of disturbing the perfect geometry of the light guide's desired cross-sectional configuration to an extent which does not substantially impede the efficient directionality of the escaping light, while allowing trapped light rays to gradually "wander" to the light scattering areas so that they can be efficiently emitted from the guide.

A wide variety of optical configurations fall within the scope of the invention. One need only determine a cross-sectional light guide geometry for which light rays which pass directly from the light scattering area to the light emitting portion of the guide at angles outside the acceptance angular range of the prism light guide material are emitted substantially non-diffusely; and, which substantially efficiently redirects back to the light scattering area (i) rays which do not pass directly from the light scattering area to the light emitting portion; and, (ii) rays which pass directly from the light scattering area to the light emitting portion but are partially or totally reflected by the prism light guide material.

In particular, it should be recognized that in various circumstances various configurations can be used to form the light scattering area in order to achieve various desirable patterns for directional output of light over a selected angular range. One need only ensure that the light is efficiently redirected as described herein, and that the light scattering area does not occupy most of the interior of the light guide, as viewed from the light emitting portion. In other words, the range of angles through which light can pass directly from the light scattering area to the light emitting portion should be substantially less than half a sphere; or, in mathematical terms, the solid angle associated with this range of vector paths should be less than $2\pi$.

This unique inventive concept can be applied by those skilled in the art of optical design to develop configurations which best meet the needs of specific uses, including uses which may not necessarily be contemplated at present. Therefore, the scope of this invention is defined and limited only by the following claims.

What is claimed is:

1. A prism light guide luminaire, comprising:
   (a) opaque and light emitting surface portions which together form a selected cross-sectional configuration;
   (b) said opaque surface portion having a light reflecting characteristic;
   (c) said light emitting surface portion comprising prism light guide material for confining, within said luminaire, light rays incident upon said material at angles falling within an acceptance angular range of said material;
   (d) a light scattering area comprising light scattering means for redirecting light into angles falling outside said acceptance angular range, said area having a predefined shape and location;
   wherein said cross-sectional configuration, said light reflecting characteristic, said light scattering area shape and location are selected such that:
     (i) light redirected by said light scattering area which does not pass directly from said scattering area to said light emitting surface portion and escape through said light emitting surface portion is substantially efficiently reflected by said material directly back onto said scattering area; and,
     (ii) all paths along which light may pass directly from said scattering area to said light emitting surface portion define a solid angle less than $2\pi$.

2. A prism light guide luminaire as defined in claim 1, wherein:
   (a) said cross-sectional configuration is approximately circular;
   (b) said light scattering area shape is an elongate strip having a length approximately equal to the length of said light emitting surface portion;
   (c) said light scattering area location is centred on a longitudinal axis of said approximately circular configuration; and,
   (d) said prism light guide material has a flat side and a right angle isosceles prismatic side, said material being oriented with said flat side facing outwardly and said prismatic side facing inwardly.

3. A prism light guide luminaire as defined in claim 2, wherein said light emitting surface portion extends along the length of said luminaire over an elongate region having a small, substantially constant width.

4. A prism light guide luminaire as defined in claim 2, further comprising a linear fresnel lens positioned adjacent to and outside said light emitting surface portion.

5. A prism light guide luminaire as defined in claim 2, further comprising an additional piece of said prism light guide material positioned parallel to and outside said light emitting surface portion with said additional piece's flat side facing inwardly, and with said additional piece's prisms aligned substantially parallel to said prisms of said light emitting surface portion material.

6. A prism light guide luminaire as defined in claim 5, wherein said light emitting surface portion extends along the length of said luminaire over an elongate region having a small, substantially constant width.

7. A prism light guide luminaire as defined in claim 5, further comprising a linear fresnel lens positioned adjacent to and outside said light emitting surface portion.

8. A prism light guide luminaire as defined in claim 5, wherein:
   (a) said additional piece is separated from said light emitting surface portion material by a selected distance; and,
   (b) said material has a selected thickness;
   whereby substantially all light transmitted through a prism face on said light emitting surface portion material strikes a parallel prism face on said additional piece.

9. A prism light guide luminaire as defined in claim 8, wherein said light emitting surface portion extends along the length of said luminaire over an elongate region having a small, substantially constant width.

10. A prism light guide luminaire as defined in claim 8, further comprising a linear fresnel lens positioned adjacent to and outside said light emitting surface portion.

11. A prism light guide luminaire as defined in claim 1, wherein:
   (a) said cross-sectional configuration is approximately a half circle;
   (b) said light emitting surface portion is on a curved portion of said cross-sectional configuration;
   (c) said light scattering area shape is an elongate strip having a length approximately equal to the length of said light emitting surface portion;
   (d) said light scattering area location is against a flat portion of said cross-sectional configuration, centred on a longitudinal axis of said approximately half-circular configuration; and, (e) said material has a flat side and a right angle isosceles prismatic side, said material being oriented with said flat side facing outwardly and said prismatic side facing inwardly.

12. A prism light guide luminaire as defined in claim 11, wherein said light emitting surface portion extends along the length of said luminaire over an elongate region having a small, substantially constant width.

13. A prism light guide luminaire as defined in claim 11, further comprising a linear fresnel lens positioned adjacent to and outside said light emitting surface portion.

14. A prism light guide luminaire as defined in claim 11, further comprising an additional piece of said prism light guide material positioned parallel to and outside said light emitting surface portion with said additional piece's flat side facing inwardly, and with said additional piece's prisms aligned substantially parallel to said prisms of said light emitting surface portion material.

15. A prism light guide luminaire as defined in claim 14, wherein said light emitting surface portion extends along the length of said luminaire over an elongate region having a small, substantially constant width.

16. A prism light guide luminaire as defined in claim 14, further comprising a linear fresnel lens positioned adjacent to and outside said light emitting surface portion.

17. A prism light guide luminaire as defined in claim 14, wherein:

(a) said additional piece is separated from said light emitting surface portion material by a selected distance; and, (b) said material has a selected thickness;

whereby substantially all light transmitted through a prism face on said light emitting surface portion material strikes a parallel prism face on said additional piece.

18. A prism light guide luminaire as defined in claim 17, wherein said light emitting surface portion extends along the length of said luminaire over an elongate region having a small, substantially constant width.

19. A prism light guide luminaire as defined in claim 17, further comprising a linear fresnel lens positioned adjacent to and outside said light emitting surface portion.

20. A prism light guide luminaire as defined in claim 1, wherein:

(a) said cross-sectional configuration is approximately elliptical;

(b) said light scattering area shape comprises two elongate strips each having a length approximately equal to the length of said light emitting surface portion;

(c) said strips are respectively centred on lines which are the locus of the foci of said approximately elliptical cross-sectional configuration;

(d) said material has a flat side and a right angle isosceles prismatic side, said material being oriented with said flat side facing inwardly and said prismatic side facing outwardly; and, (e) the ratio of the major to minor axes of said approximately elliptical cross-sectional configuration is such that light scattered by either of said light scattering area strips onto said light emitting surface portion is incident upon said light emitting surface portion at an angle at which said light is refracted through said material into a single direction which is approximately perpendicular to said flat side at that point.

21. A prism light guide luminaire as defined in claim 20, wherein said light emitting surface portion extends along the length of said luminaire over an elongate region having a small, substantially constant width.

22. A prism light guide luminaire as defined in claim 20, further comprising a linear fresnel lens positioned adjacent to and outside said light emitting surface portion.

23. A prism light guide luminaire as defined in claim 1, wherein:

(a) said cross-sectional configuration is approximately half an ellipse;

(b) said light scattering area shape comprises two elongate strips each having a length approximately equal to the length of said light emitting surface portion;

(c) said strips are located against a flat portion of said half ellipse configuration and respectively centred on lines which are the locus of the foci of said half ellipse configuration;

(d) said material has a flat side and a right angle isosceles prismatic side, said material being oriented with said flat side facing inwardly and said prismatic side facing outwardly; and, (e) the ratio of the major to minor axes of said approximately half elliptical configuration is such that light scattered by either of said light scattering area strips onto said light emitting surface portion is incident upon said light emitting surface portion at an angle at which said light is refracted through said material into a single direction which is approximately perpendicular to said flat side at that point.

24. A prism light guide luminaire as defined in claim 23, wherein said light emitting surface portion extends along the length of said luminaire over an elongate region having a small, substantially constant width.

25. A prism light guide luminaire as defined in claim 23, further comprising a linear fresnel lens positioned adjacent to and outside said light emitting surface portion.

26. A prism light guide luminaire as defined in claim 1, wherein said light emitting surface portion extends along the length of said luminaire over an elongate region having a small, substantially constant width.

27. A prism light guide luminaire as defined in claim 26, further comprising light deflecting means inside said luminaire for imparting small relative directional changes to light rays propagated through said luminaire.

28. A prism light guide luminaire as defined in claim 27, wherein said light deflecting means comprises curvature of said luminaire along a longitudinal axis thereof.

29. A prism light guide luminaire as defined in claim 27, wherein said light deflecting means comprises slight angular deviations in said cross-sectional configuration, relative to a mathematically ideal form of said cross-sectional configuration.

30. A prism light guide luminaire as defined in claim 27, wherein said light deflecting means comprises a screen mounted perpendicular to a longitudinal axis of said luminaire.

31. A prism light guide luminaire as defined in claim 1, further comprising a linear fresnel lens positioned adjacent to and outside said light emitting surface portion.

32. A prism light guide luminaire as defined in claim 31, further comprising light deflecting means inside said luminaire for imparting relatively small directional changes to light rays propagated through said luminaire.

33. A prism light guide luminaire as defined in claim 32, wherein said light deflecting means comprises curvature of said luminaire along a longitudinal axis thereof.

34. A prism light guide luminaire as defined in claim 32, wherein said light deflecting means comprises slight angular deviations in said cross-sectional configuration, relative to a mathematically ideal form of said cross-sectional configuration.

35. A prism light guide luminaire as defined in claim 32, wherein said light deflecting means comprises a screen mounted perpendicular to a longitudinal axis of said luminaire.

36. A prism light guide luminaire as defined in claim 1, further comprising light deflecting means inside said luminaire for imparting small relative directional changes to light rays propagated through said luminaire.

37. A prism light guide luminaire as defined in claim 36, wherein said light deflecting means comprises curvature of said luminaire along a longitudinal axis thereof.

38. A prism light guide luminaire as defined in claim 36, wherein said light deflecting means comprises slight angular deviations in said cross-sectional configuration, relative to a mathematically ideal form of said cross-sectional configuration.

39. A prism light guide luminaire as defined in claim 36, wherein said light deflecting means comprises a screen mounted perpendicular to a longitudinal axis of said luminaire.

* * * * *